Patented May 3, 1932

1,856,526

UNITED STATES PATENT OFFICE

JOHN J. WINCHESTER, OF WINCHESTER, AND ARISTIDES A. FRAGOPULOS, OF BOSTON, MASSACHUSETTS

SILICA WASH AND PROCESS OF MAKING THE SAME

No Drawing.   Application filed February 11, 1930.   Serial No. 427,644.

One object of our invention is to provide a wash, especially for foundry purposes, which will remain for an indefinite period of substantially the same consistency and uniformity throughout.

Another object is to provide a wash which will be economical in use because there will be no waste.

Another object is to provide a wash which may be applied by any standard paint spraying equipment.

Other objects will be pointed out below.

A feature of our invention is the use of a gum, in which term we include gummy substances such, for example, as gum resins, resins or oleo-resins, the gummy substance acting as an adhesive in relation to the rest of the wash. The gum which we prefer is gum acacia as this is a particularly efficient adhesive in its relationship to the other elements forming the wash.

Other features of our product and process will be pointed out below.

The preferred ingredients, the preferred relationship of the ingredients and the preferred process for making our product are as follows:

We mix about ten to ten and one-half pounds of bentonite with about eighteen gallons of water at about 50° centigrade to 60° centigrade and then stir the mixture for about 15 minutes and let it stand for about 48 hours and then stir again if necessary to procure uniform suspension or instead of allowing the mixture to stand it may be violently agitated by air to procure uniform suspension.

To the mixture just described we add about fourteen gallons of water and stir to get a uniform mixture.

We then add 375 pounds of silica flour and agitate until there is a uniform consistency of the mixture.

To this mixture an emulsified oil is added gradually with constant agitation until all the emulsified oil is added to said mixture and is completely mixed therewith.

The emulsified oil just referred to is prepared as follows:

To 7 pounds of gum acacia placed in a thoroughly dry vessel add about 13 quarts (12480 cubic centimeters) of oil, preferably linseed oil and stir. Then add at once 6240 cubic centimeters of water, the latter being preferably at 45° centigrade and agitate thoroughly until complete emulsification takes place, the gum emulsifying the oil. To this emulsion add very, very gradually about 6240 cubic centimeters of water with thorough agitation.

The specific gravity of the whole product is to be about 1.5 preferably.

The bentonite which we have referred to is an excellent colloidal agent for the purpose of keeping the silica in suspension.

While we have referred to linseed oil as the preferred oil we may use any drying oil, preferably any vegetable drying oil or any animal or fish oil. Most of the oil is absorbed by the bentonite and the oil also combines with bases in the bentonite.

The gum acacia, which we have referred to as the preferred gum, is a very efficient emulsifier and prevents separation of the oil from its condition of suspension in the water, thereby procuring complete emulsification, the gum acting not only to mix the water and oil but to maintain them mixed.

The gum acts as an adhesive in relation to the other elements and makes permanent the complete emulsification even though the type of oil and chemical analysis of the bentonite may vary.

An advantage of using oil is that there is obtained a much harder surface, more resistant to heat in making the molds or cores than has heretofore been possible and the wash resists better the cutting action of the molten metal against the surface of the mold or core.

It may be desirable in some cases that the silica flour and bentonite be mixed dry and then be added to the water and agitated until the colloidal properties of the bentonite become sufficiently active to keep the silica flour in suspension.

The emulsification of a compounded commercial core oil containing resin or other gum may be effected in a manner similar to the use of gum acacia using bentonite as a contributing emulsifying agent.

Our wash, when used in connection with sand molds or cores, for example, is applied to the inside of the mold or core in any suitable way, as by spraying or swabbing or by a paint brush, and acts as a lining to prevent the hot molten metal from getting into the sand or other material of the mold. When our wash has been so applied and then dried it produces a thin coat on the sand surface of the mold or core which is impervious to the penetration of the molten metal so that the sand may be easily cleaned from the face of the casting leaving a smooth, clean surface on the casting.

Among the advantages of our invention we may point out our wash will remain indefinitely of substantially the same consistency throughout so that it can be drawn off for use at any time without being lumpy. One result of this is that our wash is not only more efficient but it is more uniformly efficient than prior washes and another result is that all of the wash will be used and there will be no waste.

What we claim is:

1. A silica wash comprising silica, oil and gum emulsifying said oil.

2. A silica wash comprising silica, bentonite oil and gum emulsifying said oil.

3. A silica wash comprising silica; a drying vegetable oil; and gum emulsifying said oil.

4. A silica wash comprising silica; an ingredient to keep the silica in suspension; water; a drying oil in suspension in the water; and an emulsifying gum to keep the oil in a condition of suspension in the water.

5. A silica wash comprising silica; an ingredient to keep the silica in suspension; water; a drying oil in suspension in the water; and an emulsifying gum to keep the oil in a condition of suspension in the water, said wash having specific gravity of 1.5.

6. A silica wash comprising silica; a compounded commercial core oil containing emulsifying gum; and bentonite.

7. The process of making silica wash consisting in suitably mixing silica, an ingredient adapted to hold the silica in suspension and water; and then adding emulsified oil until there is complete mixture.

8. The process of making silica wash consisting in mixing water with an ingredient adapted to hold silica in suspension; then adding silica flour until there is a uniform consistency of the mixture; and then adding emulsified oil until there is complete mixture.

9. The process of making silica wash consisting in mixing water with bentonite; then adding silica flour until there is a uniform consistency of the mixture; and then completely mixing with said ingredients a mixture consisting of linseed oil held in suspension in water by gum acacia.

10. The process of making silica wash consisting in mixing silica, betonite and water; and adding an emulsified compounded commercial core oil containing emulsifying gum, the bentonite contributing to the emulsification of said oil.

11. The process of making silica wash consisting in mixing about 10½ pounds of bentonite with about eighteen gallons of water at about 50° centigrade to about 60° centigrade; then stirring the mixture to procure uniform suspension; then adding about 14 gallons of water and stirring to get a uniform mixture; then adding about 375 pounds of silica flour and agitating until there is uniform consistency of the mixture; then adding an emulsified oil gradually with constant agitation until all the emulsified oil is completely mixed with the other ingredients; said emulsified oil being prepared by adding about 12480 cubic centimeters of linseed oil to about 7 pounds of gum acacia placed in a thoroughly dry vessel and then stirring; then adding at once 6240 cubic centimeters of water at about 45° centigrade and agitating thoroughly until complete emulsification of the oil by the gum takes place; and then adding very gradually about 6240 cubic centimeters of water with thorough agitation.

12. A silicia wash comprising silicia, oil and bentonite emulsifying said oil.

JOHN J. WINCHESTER.
ARISTIDES A. FRAGOPULOS.